United States Patent [19]

Bartlett et al.

[11] 4,105,921
[45] Aug. 8, 1978

[54] ISOTOPE SEPARATION

[75] Inventors: Rodney J. Bartlett; John R. Morrey, both of Richland, Wash.

[73] Assignee: The United States of America as represented by the United States Department of Energy, Washington, D.C.

[21] Appl. No.: 727,560

[22] Filed: Sep. 28, 1976

[51] Int. Cl.² ............................................. H01J 27/00
[52] U.S. Cl. ............................ 250/423 P; 250/281; 250/288
[58] Field of Search .............. 250/281, 284, 288, 423 P

[56] References Cited
U.S. PATENT DOCUMENTS

| 3,443,087 | 5/1969 | Robieux et al. | 250/284 |
|---|---|---|---|
| 3,558,877 | 1/1971 | Pressman | 250/251 |
| 3,772,519 | 11/1973 | Levy et al. | 250/281 |
| 3,944,825 | 3/1976 | Levy et al. | 250/288 |
| 3,959,649 | 5/1976 | Forsen | 250/288 |
| 4,025,790 | 5/1977 | Jetter et al. | 250/288 |

Primary Examiner—Harold A. Dixon
Attorney, Agent, or Firm—Dean E. Carlson; Richard E. Constant; Ignacio Resendez

[57] ABSTRACT

A method and apparatus is described for separating gas molecules containing one isotope of an element from gas molecules containing other isotopes of the same element in which all of the molecules of the gas are at the same electronic state in their ground state. Gas molecules in a gas stream containing one of the isotopes are selectively excited to a different electronic state while leaving the other gas molecules in their original ground state. Gas molecules containing one of the isotopes are then deflected from the other gas molecules in the stream and thus physically separated.

8 Claims, 4 Drawing Figures

ISOTOPE SEPARATION

BACKGROUND OF THE INVENTION

There is an increasing need to develop new methods and systems to provide isotope separations as the demand for different isotopes increases for industry, science, and medicine. This is particularly true for radioactive isotopes including the various isotopes of the actinide series, such as uranium and plutonium isotopes. With these latter materials, the separation of the respective isotopes, for example, the separation of uranium-238 from uranium-235, is exceedingly difficult to accomplish due to the very similar atomic weights and chemical and physical characteristics of the isotope species. Any separation method or system has to be exceedingly selective in order to provide separation of such isotopes and, to be acceptable, should be economically competitive with other separation systems. General types of isotope separation techniques include gaseous diffusion, centrifugation and laser excitations. Of these, one of the most promising techniques utilizes laser radiation with its very narrow bandwith and high intensity to selectively excite isotopic molecules or atom from ground to excited states and then to separate them by various means from other unexcited isotopic species.

Two laser radiation isotope separation techniques which are currently being used or developed include the metal-laser and molecular gas-laser techniques. In the first, a two-step process is utilized in which a metal containing isotope which it is desired to be separated is volatilized and the vaporized metal then irradiated by one or more lasers to selectively excite one of the isotopes and cause photoionization of that isotope. The ionized isotope may then be trapped to provide an enriched metal output containing the isotope. Such a system has a number of drawbacks including the necessity to generate a signficant concentration of metal atoms in a gaseous phase. In addition, the excitation process requires two or three lasers operating sequentially to provide the desired photoionization and is consequently inefficient and difficult to achieve. Further, since the system utilizes a photoionization process, the technique is relegated to batch operation and is subject to large inefficiencies caused by collisions between the excited and neighboring non-excited species.

Another isotope separation technique utilizes a molecular gaslaser arrangement in which an infrared laser is used to irradiate a molecular gas to cause a selective excitation of a gaseous compound containing a desired isotope. The excited compound may then, by additional photoexcitation with an ultraviolet laser, be decomposed into a nonvolatile product and physically separated from the remaining gas stream. The non-volatile product and the gas stream are then enriched in one or the other of the desired isotopes. This system, like the metal vaporlaser system, requires the use of two or three lasers operating sequentially to induce the desired excitation and decomposition steps, which are inherently inefficient, and at the same time requires very high laser power levels to provide decomposition, at this time laser power levels often beyond the present state of the art. In addition, since the system requires the physical separation of a solid from a gas, it is relegated to a batch operation due to the difficulty of removing the solid from the gas stream without interrupting the flow of materials through the system. Further, exchange collisions between the highly excited species and non-excited species may degrade the purity and efficiency of the technique. In the case of uranium isotope separations where the fraction of uranium-235 in natural uranium is very low, the number of collisions of decomposed product with volatile U-238 molecules would be very high.

It would be desirable to provide a laser-induced isotope separation technique and system which would not require the excitation of the isotope species to a level at which decomposition is required and which would maintain the product in the same form as the source material. It would also be desirable if the laser induced separation technique did not require the use of high temperatures and could utilize a source material in a gaseous form so as to provide a high flow rate capability. It would further be desirable to provide a laser induced isotope separation in which the products are maintained in a gaseous form which may be physically separated without interrupting the flow of gas through the system. In addition, it would be desirable if such a technique could be utilized using relatively low-power, low energy lasers which are presently state-of-the art.

SUMMARY OF THE INVENTION

In view of the limitations of the prior art as noted above, it is an object of this invention to provide an isotope separation technique which does not require a chemical reaction or ionization of isotope species to effect separation thereof.

It is a further object of this invention to provide an isotope separation technique which utilizes a single photon excitation to excite an isotope species to a condition in which it may be separated from other isotope species.

It is a further object of this invention to provide a laser separation technique in which relatively low-power and low energy lasers may be utilized.

It is a still further object of this invention to provide a laser isotope separation technique in which the separated species of the isotopes are returned to the same physical form as feed material before excitation without any decomposition or chemical reaction taking place.

It is a still further object of this invention to provide a laser isotope separation technique in which the excited isotope species may be separated from the non-excited isotope species without interrupting the flow of material through the system and excitation steps.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention, may be made by those skilled in the art within the principles and scope of the invention as expressed in the appended claims.

The present invention relates to a method and apparatus for separating isotopic species of an element in the form of gas molecules in which all of the gas molecules are at the same electronic state in their ground state comprising selectively exciting gas molecules containing one of the isotopes to a different electronic state and magnetically or electrostatically separating gas molecules containing one of the isotopes from gas molecules containing the other isotope.

DESCRIPTION OF DRAWING

The present invention is illustrated in the accompanying drawing wherein.

DETAILED DESCRIPTION

Figure 1:
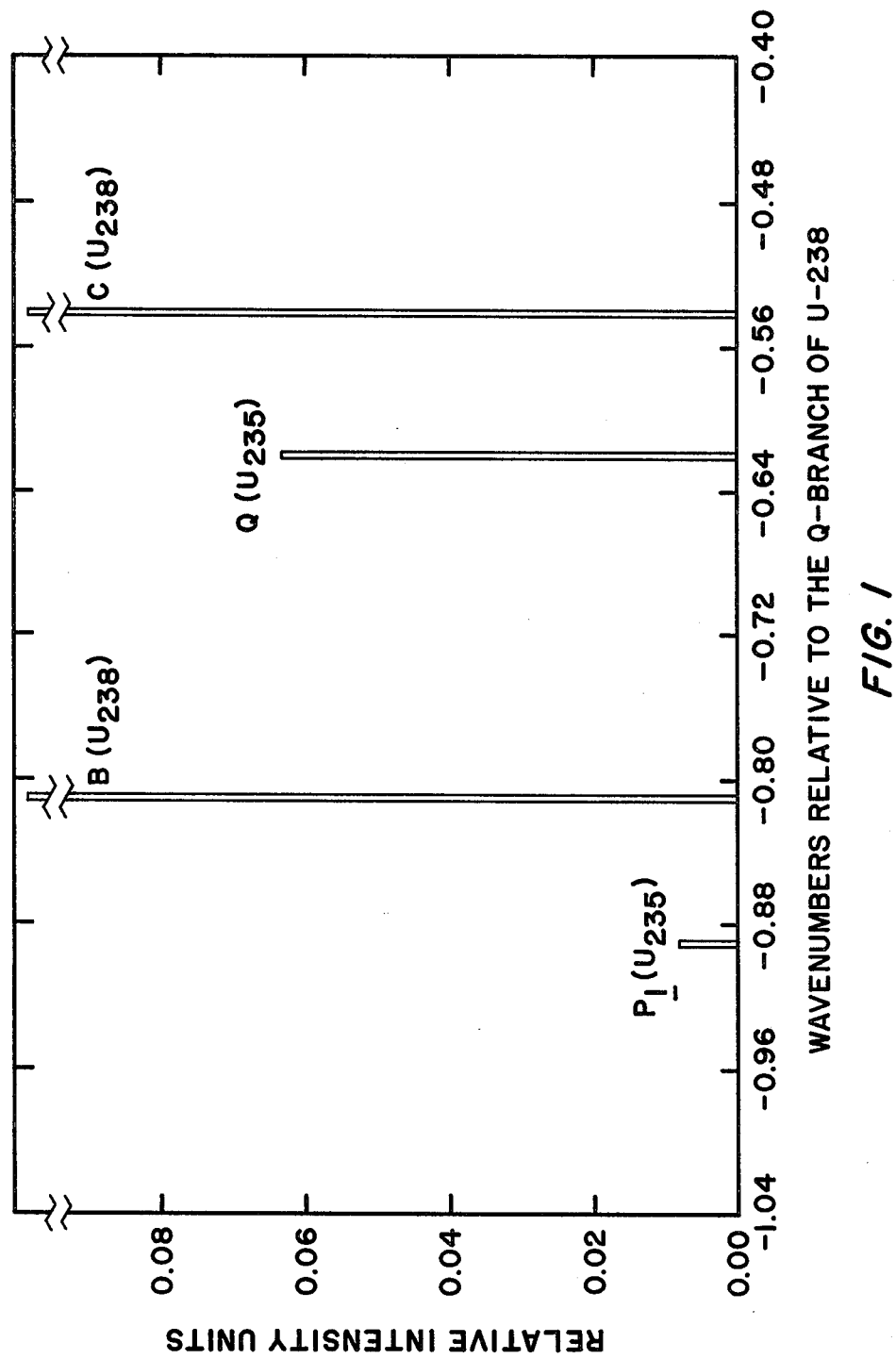
FIG. 1 is a diagram of the spectrum of two isotopes of a uranium gas compound, $U(BH_4)_4$, at a particular portion of its spectrum showing the non-overlapping character of the rotational transitions of the two isotopes $^{235}U$ and $^{238}U$. One of the lines may be utilized to effect the desired selective isotopic excitation.

Isotope separation is achieved by the present invention by changing the electronic state of a gas molecule containing an isotope of an element in a mixture of gas molecules including other isotopes of this element to a different electronic state and then magnetically or electronically deflecting gas molecules at one electronic state from gas molecules that are at a different electronic state from each other. It has been found that this may be achieved where all the gas molecules in their ground electronic state have the same magnetic or electric moments but exhibit different magnetic or electric moments when selectively excited by photon energy absorption, such as with a beam of coherent light energy. The excited and non-excited gas molecules can then be separated from each other by flowing the molecules through a magnetic or electrostatic field gradient.

All electronic states must be either diamagnetic or paramagnetic. Some gases may typically all be in the diamagnetic state at ground state while others may all be in the paramagnetic state at ground state. The gas molecules in these respective electronic states are chemically the same and differ essentially in the electronic spin and electronic orbital angular momentum of the molecules. In addition, the gas molecules in some of these electronic states may also exhibit different electric moments from those molecules in other electronic states.

When a gas molecule is subjected to a magnetic field gradient and the molecule is in a paramagnetic state, the molecule will be deflected by the magnetic field gradient. In contrast, a gas molecule in the diamagnetic state will be essentially unaffected by the magnetic field gradient. Thus, as a flow of gas molecules containing molecules in both the electronic diamagnetic state and the electronic paramagnetic state are flowed through a magnetic field gradient, the paramagnetic state gas molecules will be deflected away from the direction of flow of the gas stream. Likewise, gas molecules having different electric moments can be affected at different levels by an inhomogeneous electric field so as to deflect one from the other in a gas stream.

It is important that in order to provide the selective excitation of a particular isotope-containing gas molecule, all the molecules in the gas mixture be at the same initial electronic state regardless of the isotopes in the molecules and the respective isotope containing gas molecules exhibit transitions which may be selectively excited. Most gases exhibit a composite hot-band spectrum which is too complex at room temperature to be selectively isolated and may also include molecules at different electronic states so that it is desirable that the gas be cooled to ground state, or near ground state, before the excitation by a coherent beam of laser light. In other words, at temperatures above ground state, each vibrational transition is normally associated with a multitiude of rotational lines which may be superimposed over rotational lines of the various isotope containing molecular gases. To assure the excitation of only one vibrational transition of the desired isotope containing molecular gas, the entire gas mixture is preferably cooled to the ground state, such as by adiabatic expansion through a nozzle or orifice.

The present invention may be utilized to provide isotope separation in the form of an appropriate molecular gas which may be excited to a different electronic state having either a magnetic or electric moment different from ground state, which have sufficient excited state lifetimes to permit deflection and separation, and which have absorption cross-sections of sufficient magnitude to permit excitation. The present method may be particularly useful for isotope separation of heavy elements, such as the actinides like uranium or plutonium. For magnetic deflection systems, suitable gases may include plutonium hexafluoride ($PuF_6$), uranium borohydride $U(BH_4)_4$, and various organo-metallic uranium gases, while for electrostatic deflection systems, uranium borohydride $U(BH_4)_4$, carbon dioxide ($CO_2$), carbon disulfide ($CS_2$), ammonia ($NH_3$), and ozone ($O_3$) may be used. Many other molecules have suitable features also, which will permit their use in electrostatic or magnetic separation as described herein.

The uranium compound, uranium borohydride, is a tetrahedral monomer in its gas phase and has a vapor pressure of 4 millimeters of mercury at 60° C. A uranium atom in a tetrahedral field with spin-orbit coupling included gives rise to four types of electronic states signified by the symmetry designations A, E, $T_1$, and $T_2$. An A state is singly degenerate, E state is double degenerate, and T state is triply degenerate. Although an E state would normally be expected to have a magnetic moment, in first order, the symmetry of the tetrahedral field prohibits this. Consequently, only the T-states are paramagnetic so that a transition from the E-ground state into a suitable $T_1$ or $T_2$ excited state which are allowed transitions, will cause a change in the magnetic moment of the molecule. The magnetic moment is directly related to the "g-factor" in the particular state of the molecule, the higher the g-factor the higher the effective magnetic moment. The following table lists some of the states which uranium borohydride may be in as well as the g-factors at various transitions, the underlined transitions being potential paramagnetic states in which separation may be achieved with a magnetic field gradient. The transitions correspond to a molecular gas at about 2° K.

| | Paramagnetic Absorption Transitions for $U(BD_4)_4$ at 2° K | | |
|---|---|---|---|
| State | Observed Transition ($cm^{-1}$) | Relative Intensity | First Order g Value |
| $E(^3H_4)$ | 0 | — | — |
| $T_1(a\text{-}^3H_5)$ | 5932 | 95 | −0.79 |
| $T_2(^3H_5)$ | 6735 | 11 | −2.13 |
| $T_1(b\text{-}^3H_5)$ | 7809 | 90 | 1.53 |
| $T_1(^3F_3)$ | 8529 | 7 | −0.92 |

-continued

Paramagnetic Absorption Transitions for
$U(BD_4)_4$ at 2° K

| State | Observed Transition (cm$^{-1}$) | Relative Intensity | First Order g Value |
|---|---|---|---|
| $T_2(^3F_4)$ | 9589 | 10 | 1.10 |
| $T_1(^3F_4)$ | 10080 | 30 | 0.43 |
| $T_2(a-^3H_6)$ | 11381 | 80 | 0.31 |
| $T_1(^3H_6)$ | 12528 | 13 | 0.15 |
| $T_2(b-^3H_6)$ | 13838 | 100 | −2.23 |
| $T_2(^1D_2)$ | 15113 | 6 | −1.07 |
| $T_2(^1G_4)$ | 16357 | 10 | 2.18 |
| $T_1(^1G_4)$ | 17622 | 62 | 0.37 |
| $T_1(^3P_1)$ | 18280 | 35 | 1.43 |
| $T_2(a-^1I_6)$ | 19836 | 3 | −2.33 |
| $T_2(b-^1I_6)$ | 20694 | 80 | −0.56 |
| $T_1(^1I_6)$ | 20771 | 30 | 0.50 |
| $T_2(^3P_2)$ | 24795 | 27 | −0.85 |

A very desirable transition for separating U-235 from U-238 as uranium borohydride may be from the E-ground state to the $T_2$ excited state at the infrared transition of about 6,735 cm$^{-1}$ which has a g-factor of 2.13. Typical gas lasers which operate near this wavelength are neon, krypton, iodine, nitrogen, carbon or mercury. Typical doped glass lasers are $Nd^{3+}$ and $Er^{3+}$ doped $CaF_2$-$YF_3$, or $CaF_2$. In addition, continuously tuned paramagnetic oscillator lasers will operate in this range. The radioactive lifetime of the excited molecule is inversely proportional to the oscillator strength and the transition in wavenumbers, and in this case would be greater than about 10$^{-2}$ seconds with an oscillator strength of about 10$^{-6}$ (dimensionless). Thus, it maybe seen that this oscillator strength is adequate to provide the desired transition and yet retain a sufficiently long excited state lifetime to pass through the magnetic field gradient to effect separation of the excited isotopes.

FIG. 1 illustrates the spectrum of uranium borohydride in the region near 6,735 cm$^{-1}$ at about 2° K (ground state). The more intense transitions which extend beyond the absorption scale correspond to U-238 $(BH_4)_4$ while the remaining lines correspond to U-235 $(BH_4)_4$. Under these physical conditions, the Q-branch of the U-235 containing gas molecule is sufficiently narrow to be unencumbered for a number of electronic transitions, including the one near 6,735 cm$^{-1}$.

It should also be noted tht plutonium hexafluoride exhibits suitable transitions near 4759 cm$^{-1}$, 9920 cm$^{-1}$, and 12,502 cm$^{-1}$ from the diamagnetic ground state to a paramagnetic excited state. Other feed gases will exhibit similar spectra and vibrational transitions to achieve desired electronic state changes having different magnetic moments.

Isotope separation utilizing an inhomogeneous electric field may be achieved using molecular feed gases which may be selectively excited so an electronic state with a different electric moment than the molecule in the ground state. This could be a dipole, quadrupole, or even higher electric moment. (One mechanism whereby this occurs for tetrahedral molecules is the Jahn-Teller effect, which causes a distortion of the species from its ground state geometry.) The greater the difference in moments, the greater the deflection for a given electric field. Examples of gases and the states in which they may be excited to with given wavelength photons are illustrated in the following table:

| States | Symmetry | Energy from Ground State (cm$^{-1}$) |
|---|---|---|
| $\tilde{X}^1\Sigma_g^+$ | $D_{\infty h}$ | 0 |

-continued

| States | | Symmetry | Energy from Ground State |
|---|---|---|---|
| $CO_2$ | $\tilde{A}^1B_2$ | $C_{2v}$ | 46000 |
| | $B^1A_1$ | $C_{2v}$ | 72480 |
| | $B^1B_1$ | $C_{2v}$ | 73100 |
| | $X^1\Sigma_g^+$ | $D_{\infty h}$ | 0 |
| $CS_2$ | $\tilde{A}^3A_2$ | $C_{2h}$ | 26187 |
| | $A^1B_2$ | $C_{2v}$ | 45950 |
| | $X^1A_1$ | $C_{2v}$ | 0 |
| $NH_3$ | $\tilde{A}^1A_2''$ | $D_{3h}$ | 46136 |
| | $B^1E''$ | $D_{3h}$ | 59225.5 |
| | $C^1A_1'$ | $D_{3h}$ | 63771 |
| | $D^1A_2''$ | $D_{3h}$ | 69631 |
| | $E^1A_2''$ | $D_{3h}$ | 75205 |

Other gases which should undergo distortions from a Td (tetrahedral) ground state to certain excited states in which the molecule has $C_{3v}$ symmetry and a dipole moment due to the Jahn-Teller effect are ruthenium tetroxide ($RuO_4$), osmium tetroxide ($O_sO_4$) and uranium borohydride ($U(BH_4)_4$).

The carbon dioxide and carbon disulfide molecules exhibit no electric moments at ground state and are excitable to excited states with electric moments while ammonia exhibits a dipole moment ground state and is excitable to states which exhibit no dipole moments. Ozone, as an example of the most general possibility, exhibits a dipole moment of about 0.532 at ground state and when excited to the $1^1B_2$ state exhibits a dipole moment of about 1.03, which gives a factor of two in the electric moment that may be easily exploited by different degrees of deflection in the electric field scheme. Ozone can also be excited to the $2^1A_1$ state which has a perfect equilateral triangle symmetry and exhibits no dipole moment.

For these lighter element molecular gases, the rotational spacing and isotope splitting are more pronounced than for the heavier isotopes and elements and are therefore more readily selectively excited by a tunable laser. It should be noted, that with the molecular gas compounds, isotope separation may be achieved using this system and method for and of the elements in the compound.

Figure 2:
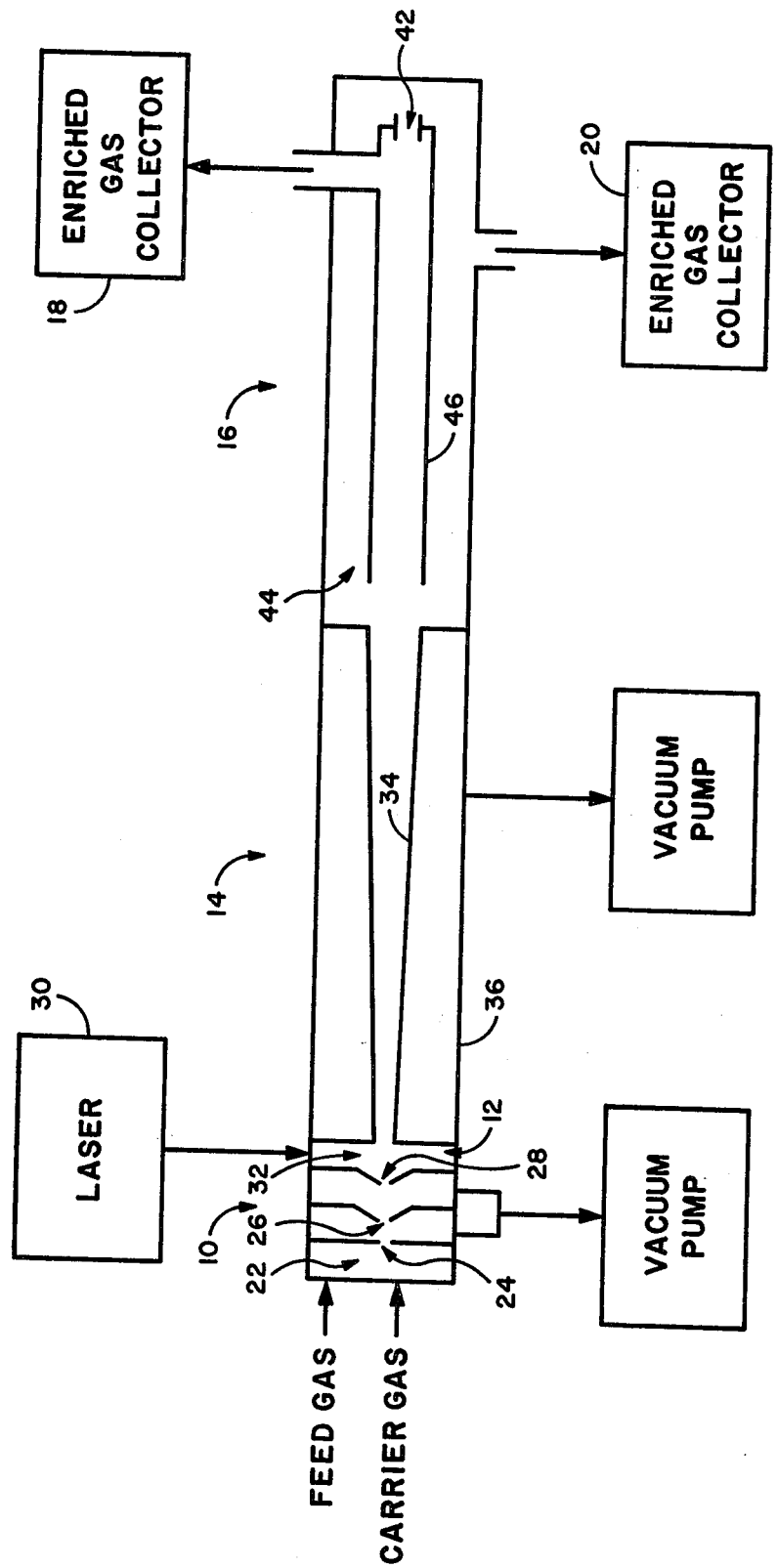
FIG. 2 is a diagrammatic representation of a laser induced separation system which utilizes features of this invention.

The apparatus which may be used to provide isotope separation in accordance with this invention is illustrated in FIG. 2. The apparatus includes a molecular gas flow generation section 10, a laser excitation section 12, a molecular deflection section 14, (which is shown for purpose of illustration as a magnetic deflection section) and a molecular gas separation section 16. An appropriate feed gas containing more than one isotope of an element (such as U-235 and U-238 as uranium borohydride) is mixed with a suitable carrier gas, if needed, in the molecular gas flow generation section 10 and a gas enriched in one isotope and a gas enriched in another isotope or isotopes are removed from the separation section 16 into appropriate storage systems 18 and 20. The gas in the respective collectors 18 and 20 are enriched in one or the other of the isotopes contained in the feed gas.

In order to ensure that energy transfer via collisions and the loss of selectivity which accompanies such collisions will be kept to a minimum, it is desirable that the feed gas achieve a molecular flow as it is directed through the laser excitation system 12 and molecular deflection section 14. This is achieved in the molecular flow generation section 10 by pumping the feed gas and carrier gas mixture into a reservoir or chamber 22 at a rate to maintain a suitable pressure to effect flowing of the gas through an adiabatic expansion nozzle 24 into a region which is appropriately evacuated to achieve an adequate gas temperature for spectroscopic selectivity. After the adiabatic expansion, the gas flow is transformed from an isentropic flow to a molecular flow which is almost collisionless. In addition, the gas flow and adiabatic expansion through the nozzle produces a cooling effect within the gas to bring the gas to its ground state. For example, $U(BH_4)_4$ in an Ar carrier gas may require a pressure difference of about 1.5 atmosphere between the reservoir 22 and the evacuated region to produce a rotational temperature of about 2° K. This effectively populates only a few of the rotational states associated with each vibrational state to allow selection of a unique transition line. However, if the flow is allowed to continue, a shock wave may build up to cause a perturbation which may cause a decrease in the velocity of the gas accompanied by heating. This effect may be eliminated by the introduction of a skimmer opening or aperture 26 in the gas flow between the second region and a third region evacuated to a still lower pressure, such as to about $10^{31\ 4}$ Torr or lower. The skimmer aperture 26 skims off the core of the gas flow before the particles run into the shock wave commonly referred to as the "mach disk." The skimmer aperture 26 is most advantageously positioned just in front of the mach disk. Further aperturing may be provided by an opening 28 if such is desirable to collimate the flow and enhance its directionality.

After the flow has passed through the skimmer aperture 26 and aperture 28, the molecular gas flow may be subjected to photon radiation from a laser 30 in chamber 32 tuned to a desired transition line of the selected isotope containing molecules to effect excitation thereof to a different electronic state. More uniform irradiation and absorption in the gas stream may be achieved by focusing two opposing laser beams through the gas stream in radiation chamber 32. The molecular gas stream or flow after irradiation includes some molecules at ground state and some molecules in an excited electronic state different from the ground state. The molecules in a paramagnetic electronic state may be subjected to a magnetic field gradient to effect deflection of these molecules from the initial directed path of travel of the gas. As stated previously, this gas flow is molecular, highly collimated, and directional as it enters the channel 34 of molecular deflection section 14.

Figure 3:
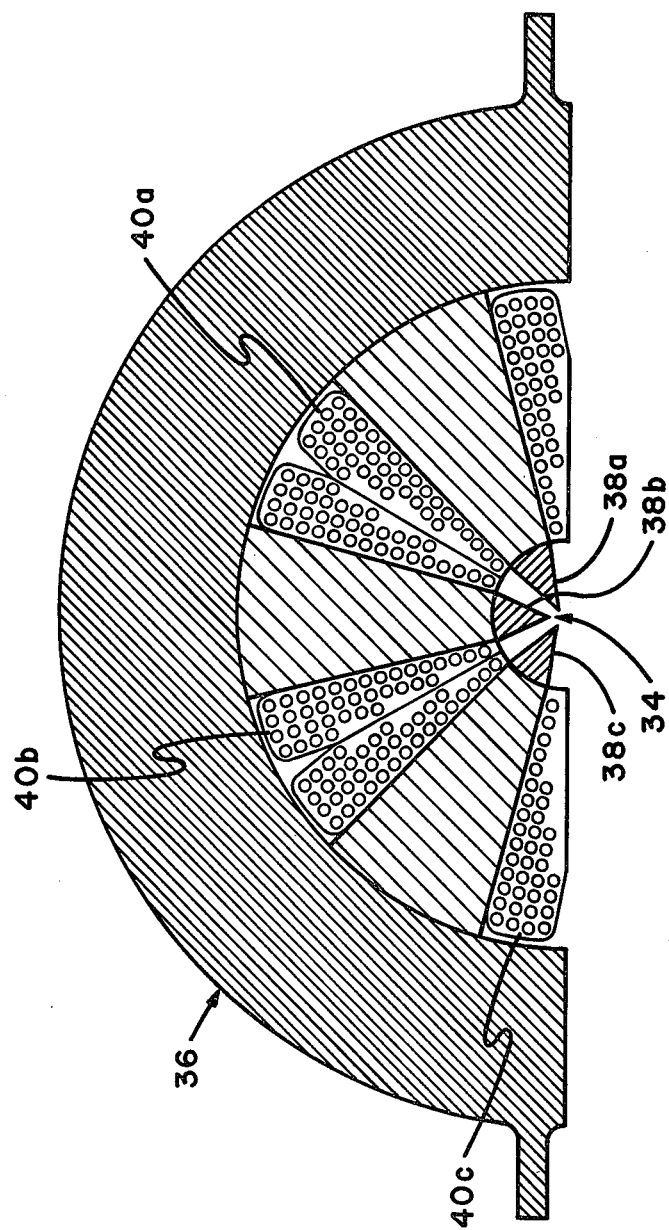
FIG. 3 is a somewhat simplified cross-sectional view of a portion of a magnet which may be utilized in the system of FIG. 2.

In order to provide the desired isotope separation, the deflection section 14 should provide enough displacement or velocity change to allow physical separation of the excited molecules from the molecules which are unaffected by the laser irradiation with a sufficiently large through-put to be useful in the sense of providing a significant volume or quantity of enriched gas output. A magnetic or electric system having a one dimensional magnetic field gradient, such as produced by a Stern-Gerlach dipole magnet or two parallel electrode electric field generator and as described more fully below with respect to FIG. 4, may be used but would be limited as to the width of the molecular beam which could be directed through the magnetic or electric field gradient and thus in turn limit the quanitity of molecular gas which could be flowed through the system and separated. A magnetic or electric field arrangement which would be more suitable in that it permits higher flow rates would be a superconducting loop encircling the gas stream in which a paramagnetic state would be produced in the desired molecules. A shutter system could then be used to physically separate the non-affected molecules taking advantage of this difference in velocity. For a loop having a magnetic field at its center of about 160 kilogauss, a velocity change of greater than 115 centimeters per second may be realized. However, it has been found that the currently preferred approach is to use a multipole focusing magnetic or electrostatic field. The more poles used, the greater the complexity of the magnet but the more uniform the magnetic field configuration. It has been found that a six pole focusing magnet is a preferred arrangement. The focusing magnet acts essentially like a lens for paramagnetic molecules and has a gradient perpendicular to its axis having a magnetic fieldstrength which is greatest next to the pole pieces and diminishing to zero at the axis. This enables the magnet to produce a maximum force on molecules that are furthest from the magnet axis with proportionally smaller forces produced approaching the axis, effecting first collimation and then focusing to a small circular area those molecules having magnetic moments aligned in the proper manner with the magnetic field. Molecules having their moments oppositely aligned will be defocused away from the axis. Such a magnet is illustrated in FIG. 2 by magnet 36 and in FIG. 3 by the expanded cross-sectional view of one-half of magnet 36 to maximize the interaction between the magnet and the paramagnetic molecules. The diameter of channel 34 of magnet 36 should increase with length, as shown in FIG. 1, so as to have the radius of the poles always equal to the off-axis displacement of the outermost molecules to be focused. Since this may mean that some molecules which are not deflected may collide with the walls of the magnet, evacuation of the openings between the poles should be provided, as shown in FIG. 2. In the magnet 36 shown in FIG. 3, the magnetic pole pieces 38a, 38b, and 38c are symmetrically arranged around channel 34 using permanently magnetizable iron or the like with individual coils wrapped around each pole piece, as shown by coils 40a, 40b and 40c, to initially magnetize each of the pole pieces to a desired permanent magnetization. Once the pole pieces are magnetized, no further energy must be applied to the magnet to operate the separation system.

The focused paramagnetic molecules may exit collection section 16 through aperture 42 while the defocused paramagnetic molecules may be dispersed annularly around channel 46 through annular space or channel 44 in collector 20. The molecular gas in collector 20 will thus be enriched in the molecular gas containing the isotope which was in a paramagnetic state in magnetic deflection section 14. The remaining diamagnetic electronic state molecules are removed from channel 46 to collector 18 and are enriched in the isotope which is in that state in the magnetic deflection section 14. One or the other of the enriched gases collected may be fed back to flow generation section 10 as part of the feed gas to get further enrichment.

In a typical isotope separation system using uranium borohydride as a feed gas, the molecular flow generation section and laser radiation section 12 may be about 3 or 4 centimeters long while the magnetic deflection section 14 may be about 1.3 meters and the separation section may be about 2.7 meters in length. The overall diameter of the system at its largest dimension may be about 40 centimeters. Using a laser having a power level of about 286 milliwatts at a wavelength at about 6,735 $cm^{-1}$, enrichments of U-235 of up to 80% may be achieved in collector 20. The excited molecules after such an irradiation will have a lifetime of about $2.1 \times 10^{-3}$ seconds.

It will be apparent that increased output may be achieved by positioning a plurality of systems as shown in FIG. 2 either in parallel or series or series-parallel arrangement to achieve any desired volume of isotope separation output and degree of enrichment. For example, the systems may be arranged in a bank in parallel with their respective outputs being suitably collected in common enriched gas collectors.

Figure 4:
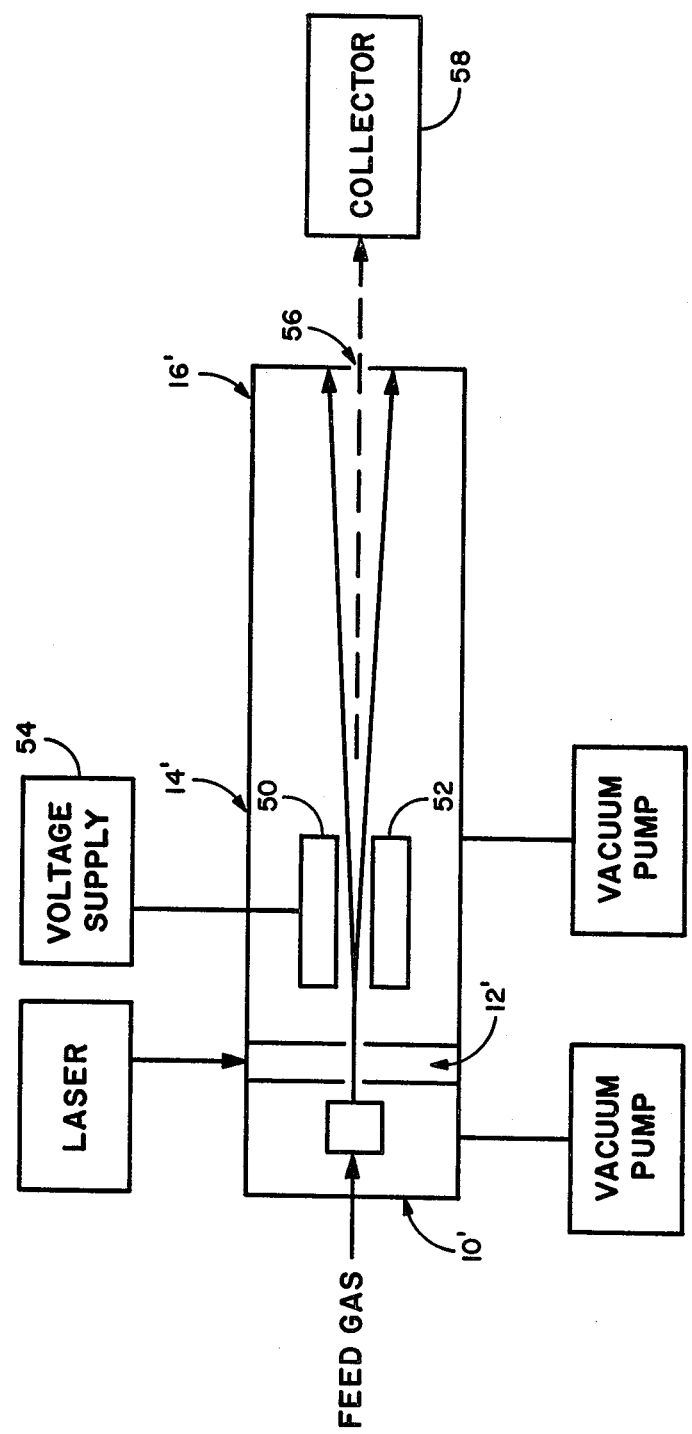
FIG. 4 is a diagrammatic view of another laser isotope separation system utilizing a different deflecting arrangement than that shown in FIG. 2.

Another apparatus is illustrated in FIG. 4 which may be used for either electrostatic or magnetic deflection of the excited gas to effect isotope separation. In this system, a feed gas is directed through a molecular gas flow generation section 10', a laser excitation section 12', a molecular deflection section 14', and molecular gas separation section 16', similar to the system shown in FIG. 2. In the embodiment shown, the molecular deflection section 14' includes a pair of electrodes 50 and 52 having a Stern-Gerlach configuration, connected to voltage supply 54 so as to provide an electrostatic gradient transverse to the flow of the excited and unexcited gas molecules in the gas stream of the system. The inhomogeneous electric field will effect deflection of the gas molecules having a different dipole moment from other gas molecules so that one of the groups of molecules may be passed through an opening or slit 56 in a wall of collector section 16' to be collected in a collector 58. Because of the configuration of the electrostatic field between electrodes 50 and 52 provided by the potential produced by voltage supply 54, the volume of the gas stream is limited by the width of the electrodes that may be conveniently utilized and the rate of pump down provided by the vacuum pumps. It will be apparent that magnetic deflection may also be utilized in the system of FIG. 4 by substituting magnet poles for the electrodes 50 and 52.

What is claimed is:

1. A method for separating molecules of a gas containing a first isotope of an element from molecules of the same gas containing a second isotope of said element, all of said molecules being at the same initial electronic state, wherein said molecules are not decomposed nor ionized during said separating, comprising continuously flowing a stream of gas molecules containing said first and second isotopes along a first path, continuously selectively exciting gas molecules in said stream containing one of said isotopes to a different electronic state; continuously flowing said stream containing said excited and non-excited gas molecules through an inhomogeneous deflecting field, continuously deflecting by said inhomogeneous deflecting field the gas molecules containing one of said isotopes from said first path to a second path; and, without further excitation, continuously collecting gas molecules containing one of said isotopes traveling along one of said paths, wherein said collected gas molecules are of the same composition as the gas molecules before said exciting to a different electronic state.

2. The method of claim 1 including collecting gas molecules containing the other of said isotopes traveling along said other path.

3. The method of claim 2 including mixing the collected gas molecules from one of said paths with said flowing gas stream.

4. The method of claim 1 wherein said selective exciting is by directing a laser beam tuned to a transition line of said gas molecules to be excited through said stream, said transition line being selected to provide an excited state having a lifetime which exceeds the molecule travel time during said deflecting.

5. The method of claim 4 wherein said gas molecules to be excited are gas molecules containing the isotope of lowest quantity in said beam.

6. The method of claim 1 wherein said gas molecules contain the isotopes $U_{238}$ and $U_{235}$.

7. The method of claim 1 wherein said deflecting includes providing an inhomogeneous electrostatic field having a gradient perendicular to the direction of flow.

8. The method of claim 1 wherein said deflecting includes providing an inhomogeneous magnetic field having a gradient perpendicular to the direction of flow.

* * * * *